Figure 1:
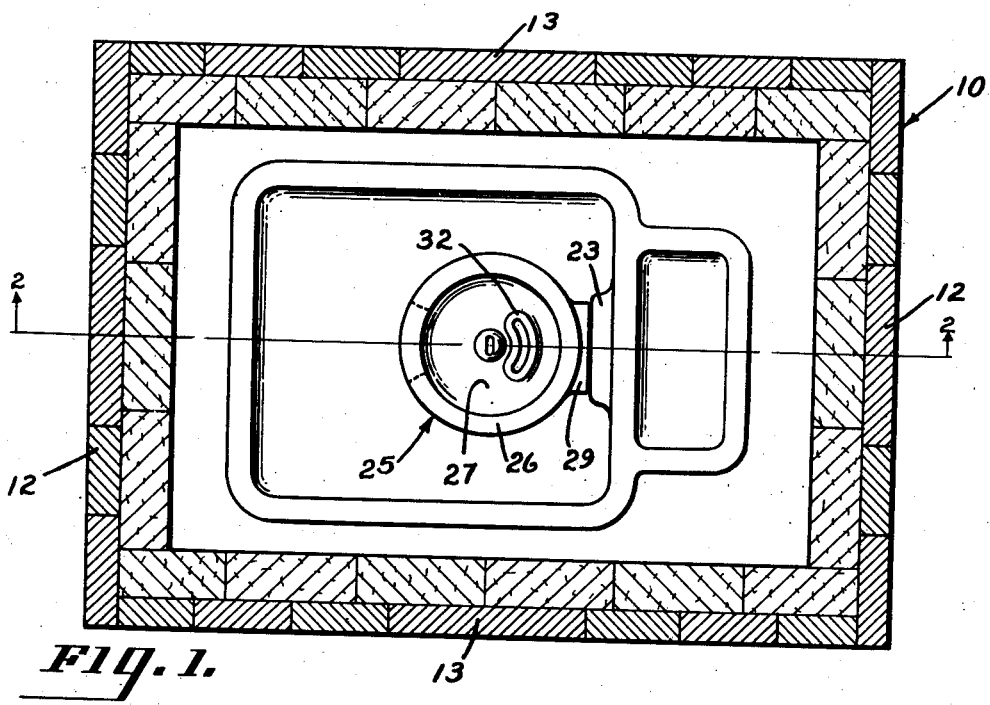

July 25, 1933.   W. H. SAID   1,919,259
APPARATUS FOR DRAWING TUBING CONTAINING A STRIPE OF CONTRASTING GLASS
Filed July 22, 1932

INVENTOR.
WILLIAM HOWARD SAID
BY Dorsey & Cole
ATTORNEYS.

Patented July 25, 1933

1,919,259

UNITED STATES PATENT OFFICE

WILLIAM HOWARD SAID, OF CORNING, NEW YORK, ASSIGNOR TO CORNING GLASS WORKS, OF CORNING, NEW YORK, A CORPORATION OF NEW YORK

APPARATUS FOR DRAWING TUBING CONTAINING A STRIPE OF CONTRASTING GLASS

Application filed July 22, 1932. Serial No. 624,089.

This invention relates to tube drawing apparatus and more particularly to apparatus for the production of instrument tubing such as is employed in the manufacture of thermometers and the like.

The object of the invention is to accurately shape the glass as it is being drawn and to definitely shape and locate the color stripe in the finished tubing.

Another object is to simplify the operation and the apparatus for the production of tubing containing a contrasting stripe.

Among its features my invention embodies a container for molten glass having adjacent one side a receptacle for molten contrasting glass, and a drawing pot having a glass inlet submerged below the level of the glass in the container, said drawing pot forming a shaper to govern the shape of the glass as it is drawn and having an opening in its bottom through which air to form the bore may be introduced into the glass as it is being drawn and a nipple in the drawing pot, said nipple communicating with the receptacle whereby contrasting glass is introduced into the glass which is being drawn, said nipple serving as a shaper for shaping the contrasting glass as it enters the glass which is being drawn.

Figure 2:
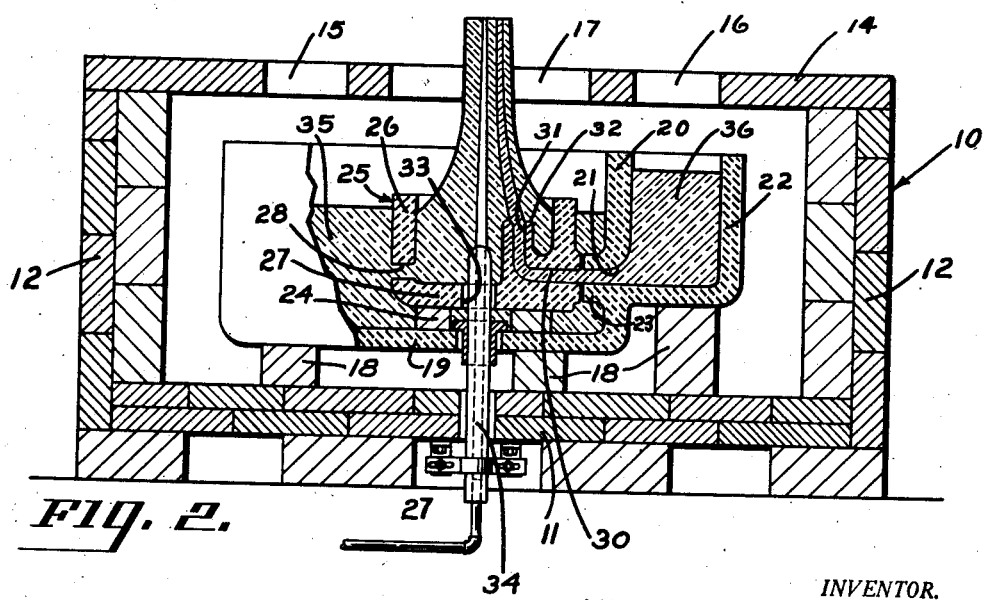

Fig. 1 is a horizontal sectional view through a reheating furnace showing my glass containers and drawing pot in place therein; and Fig. 2 is a longitudinal sectional view on the line 2—2 of Fig. 1.

Referring to the drawing in detail, the reheating furnace designated generally 10 comprises a bottom 11, end walls 12, side walls 13 and a cover block 14 which latter is formed with filling openings 15 and 16 and a drawing opening 17. The furnace is provided with the usual ports (not shown) for the admission of heating burners by which the temperature is maintained at the desired degree.

Resting on the bottom 11 are supporting blocks 18 by which a container for molten glass 19 is supported in spaced relation to the bottom of the furnace. The end wall 20 of the container 19 is formed with an opening 21 near its bottom which communicates with the interior of a receptacle 22 for contrasting glass. Surrounding the opening 21 and projecting into the container 19 is a boss 23 for engagement with one side of the drawing pot as will be hereinafter described.

Resting on supporting blocks 24 in the container 19 is the drawing pot designated generally 25 which in its present form comprises a substantially cylindrical body 26 which is closed at its lower end by a bottom wall 27. Formed near the bottom 27 in the cylindrical body 26 is a port 28 which communicates with the interior of the receptacle 19 and formed on the exterior of the body 26 diametrically opposite the port 28 is a boss 29 which is provided with a passage 30. Projecting upwardly within the drawing pot in spaced relation to the side walls thereof is a nipple 32 having formed therein an upwardly extending passage 31 which communicates with the passage 30 as clearly illustrated in the drawing. As shown in Fig. 1, the drawing pot 25 is of circular cross-section and the nipple 32 is substantially crescent shaped and this construction will produce tubing having a circular cross-section with a crescent shaped stripe of contrasting glass embedded therein. It is to be understood however that the drawing pot may be varied in shape so as to produce tubing having the desired cross-section and likewise the shape of the nipple 32 may be altered to produce a contrasting stripe having the desired cross-section. As shown in Fig. 2, the bottom 27 of the drawing pot 25 is provided with an opening 33 for the reception of a pipe 34 by means of which air may be introduced into the interior of the glass being drawn so as to form a bore therein, it being obvious that the pipe is admitted through suitable openings formed in the bottom of the container 19 and the bottom 11 of the furnace.

In operation, clear glass 35 is ladled through the opening 15 into the container 19 and the desired contrasting glass 36 is ladled into the receptacle 22, it being understood that the temperature of the furnace is maintained to a degree where the glass will remain fluid. A bait is then let down through the drawing opening 17 into contact with the surface of the glass in the drawing pot 25 and upon being drawn upwardly it will be seen that the glass contained in the drawing pot 25 will follow the bait and assume the shape given to it by the drawing pot. Obviously as the clear glass is drawn upwardly, the contrasting glass flowing through the openings 21, 30 and 31 will follow and by reason of the initial shape given to it by the nipple 32, its contour will remain substantially the same throughout the entire length of the draw. Upon admitting air through the pipe 34 it will be obvious that a bore will be formed within the glass which is being drawn thus forming a tube having embedded beneath its surface a stripe of contrasting glass. It is obvious that by altering the shape of the drawing pot 25 lens front tubing may be produced and also that by changing the shape of the nipple 32 the shape of the stripe of contrasting glass will be altered.

The device as above described lends itself readily to the rapid and accurate drawing of glass and, moreover, the drawing pot may be readily removed and a pot of the desired shape inserted where it is desired to change the style of tubing being made.

While in the foregoing there has been shown and described the preferred embodiment of my invention it is to be understood that minor changes in the details of construction, combination, and arrangement of parts may be resorted to without departing from the spirit and scope of the invention as claimed.

I claim:

1. In an apparatus for drawing glass, a container for molten glass, a receptacle for contrasting glass adjacent said container, a drawing pot within the container, said drawing pot communicating with the container and a hollow nipple within the drawing pot communicating with the receptacle for contrasting glass.

2. In an apparatus for drawing tubing, a container for molten glass, a drawing pot within said container communicating therewith, a receptacle for contrasting glass adjacent said container, a hollow glass shaping nipple within the drawing pot, said nipple communicating with the interior of the receptacle for contrasting glass and means for introducing air into the drawing pot near the nipple.

3. In a tube drawing apparatus, a drawing pot having an air admitting opening in its bottom and an upwardly extending shaping nipple within the drawing pot near the air admitting opening.

4. In a tube drawing apparatus, a drawing pot, means for admitting glass to the drawing pot, said drawing pot having an air admitting opening in its bottom, a glass shaping nipple extending upwardly from the bottom of the drawing pot near the air admitting opening and means for admitting contrasting glass to the shaping nipple.

5. Glass drawing apparatus including a container for molten glass, a receptacle for contrasting glass adjacent said container, said container having an opening communicating with the receptacle, a boss surrounding the opening and projecting into the container, a drawing pot in the container, a boss on said drawing pot, said boss abutting the afore-mentioned boss and having a passage therein which communicates with the opening in the container, a hollow nipple extending upwardly within the drawing pot, the hole in the nipple communicating with the passage in the boss, and a port in said pot for admitting glass from the container into the pot.

6. Glass drawing apparatus including a container for molten glass, a receptacle for contrasting glass adjacent said container, said receptacle having a passageway in one wall, a drawing pot in the container, the walls of said drawing pot being in spaced relation to the walls of the container and a hollow nipple extending upwardly within the drawing pot and spaced away from the walls thereof, said drawing pot having a passageway connecting the opening in the nipple with the passageway of the receptacle and having a port for admitting glass from the container into the interior thereof.

WILLIAM HOWARD SAID.